United States Patent
Knoedl

(10) Patent No.: US 10,285,473 B2
(45) Date of Patent: May 14, 2019

(54) LATCH PLATE AND METHOD FOR PRODUCING A LATCH PLATE

(71) Applicant: TRW AUTOMOTIVE GMBH, Alfdorf (DE)

(72) Inventor: Ralf Knoedl, Alfdorf (DE)

(73) Assignee: TRW Automotive GmbH, Alfdorf (DE)

( * ) Notice: Subject to any disclaimer, the term of this patent is extended or adjusted under 35 U.S.C. 154(b) by 78 days.

(21) Appl. No.: 15/305,674

(22) PCT Filed: May 12, 2015

(86) PCT No.: PCT/EP2015/000972
§ 371 (c)(1),
(2) Date: Oct. 21, 2016

(87) PCT Pub. No.: WO2015/172879
PCT Pub. Date: Nov. 19, 2015

(65) Prior Publication Data
US 2017/0055643 A1     Mar. 2, 2017

(30) Foreign Application Priority Data
May 16, 2014   (DE) .................. 10 2014 007 125

(51) Int. Cl.
*A44B 11/25* (2006.01)
*A44B 11/10* (2006.01)
(Continued)

(52) U.S. Cl.
CPC .......... *A44B 11/2557* (2013.01); *A44B 11/10* (2013.01); *A44B 11/16* (2013.01);
(Continued)

(58) Field of Classification Search
CPC ............ A44B 11/2557; A44B 11/2553; A44B 11/2561; A44B 11/16; A44B 11/10; B60R 22/18; B60R 2022/1812
See application file for complete search history.

(56) References Cited

U.S. PATENT DOCUMENTS 5,058,244 A * 10/1991 Fernandez ............. A44B 11/12
                                                        24/136 K
5,100,176 A *  3/1992 Ball .................... A44B 11/2557
                                                        24/171
(Continued)

FOREIGN PATENT DOCUMENTS

| EP | 1447021    |   | 8/2004 |            |
|----|------------|---|--------|------------|
| WO | 2012-105762 | * | 8/2012 | ............ B60R 22/12 |
| WO | 2013099590 |   | 4/2013 |            |

*Primary Examiner* — Robert Sandy
*Assistant Examiner* — Louis A Mercado
(74) *Attorney, Agent, or Firm* — Tarolli, Sundheim, Covell & Tummino LLP

(57) ABSTRACT

A locking tongue for a seat belt has a deflecting portion for a webbing. The deflecting portion includes a webbing passage and a clamping element. The clamping element is displaceable between a home position in which the webbing is freely movable and a blocking position in which the clamping element is displaced against a wall of the webbing passage so that the webbing is clamped between the clamping element and the wall of the webbing passage. The clamping element includes a clamping surface which in the blocking position clamps the webbing against the wall of the webbing passage. The clamping element is guided along a curved guide path extending in an area of the blocking position substantially perpendicularly to the wall so that in the blocking position the clamping element is moved against the wall substantially perpendicularly with the clamping surface.

18 Claims, 7 Drawing Sheets

(51) Int. Cl.
  *A44B 11/16* (2006.01)
  *B60R 22/18* (2006.01)
(52) U.S. Cl.
  CPC ...... *A44B 11/2553* (2013.01); *A44B 11/2561* (2013.01); *B60R 22/18* (2013.01); *B60R 2022/1812* (2013.01)

(56) References Cited

U.S. PATENT DOCUMENTS

| | | | | |
|---|---|---|---|---|
| 5,806,148 A * | 9/1998 | McFalls | ............. | A44B 11/2561 24/168 |
| 5,870,816 A | 2/1999 | McFalls et al. | | |
| 7,010,836 B2 * | 3/2006 | Acton | ................ | A44B 11/2557 24/170 |
| 7,325,280 B2 * | 2/2008 | Ichida | ................ | A44B 11/2557 24/170 |
| 7,712,194 B2 * | 5/2010 | Fyhr | ................. | A44B 11/2553 24/171 |
| 8,382,160 B2 * | 2/2013 | Disley | ................ | A44B 11/2553 24/171 |
| 9,623,837 B2 * | 4/2017 | Moker | ............... | A44B 11/2561 |
| 9,821,757 B2 * | 11/2017 | Moeker | ............. | A44B 11/2553 |
| 2016/0206050 A1 * | 7/2016 | Aoyagi | ............. | A44B 11/2561 |

\* cited by examiner

LATCH PLATE AND METHOD FOR PRODUCING A LATCH PLATE

RELATED APPLICATIONS

This application corresponds to PCT/EP2015/000972, filed May 12, 2015, which claims the benefit of German Application No. 10 2014 007 125.1, filed May 16, 2014, the subject matter of which are incorporated herein by reference in their entirety.

BACKGROUND OF THE INVENTION

The invention relates to a locking tongue for a seat belt comprising an inserting portion adapted to be inserted into a belt buckle and a deflecting portion for webbing, wherein the deflecting portion includes a webbing passage and a damping element for the webbing and wherein the clamping element is displaceable between a home position in which the webbing is freely movable and a blocking position in which the damping element is displaced against a wall of the webbing passage so that the webbing is clamped between the clamping element and the wall of the webbing passage, with the clamping element having a damping surface which in the blocking position damps the webbing against the wall of the webbing passage.

The invention further relates to a method of manufacturing such locking tongue.

In three-point belts looking tongues form a deflection point between a first portion of the seat belt which in the case of restraint restrains the pelvis of the vehicle occupant and a second portion which protects the upper body of the vehicle occupant against a forward out-of-position movement. The locking tongue is threaded with the defecting portion onto the webbing of the seat belt so that the locking tongue may be displaced freely along the webbing. This helps to adapt the length of the two portions of the seat belt to the vehicle occupant during buckling. In addition, by displacing the webbing by the locking tongue the webbing may be orientated so that it is in uniform contact with the vehicle occupant.

In the case of restraint the upper body may happen to move forward while the seat belt is blocked. Since the webbing is movably guided in the locking tongue, the webbing may be displaced so that the portion adjacent to the upper body is lengthened and the portion adjacent to the pelvis is shortened, thus causing the seat belt to constrict the pelvis area.

In order to prevent this, locking tongues include, for example, clamping elements which upon blocking of the seat belt may be displaced between a home position in which the webbing is freely movable and a blocking position in which the damping element clamps the webbing to the locking tongue so that no displacement of webbing is possible between the first and second portions of the seat belt. The pelvis area is thus protected against constricting by the seat belt and the upper body is protected against excessive forward out-of-position movement.

In the known locking tongues the webbing passage in which the clamping element is moved in the blocking position extends transversely to the longitudinal direction of the locking tongue. In the case of restraint the webbing is forced against the clamping element by the tensile force acting on the webbing. When the webbing is displaced relative to the locking tongue, for example by increased tension acting on the upper body portion, the damping element is drawn into the webbing passage by the webbing due to the increased friction between the clamping element end the webbing, until the clamping element blocks the webbing. In said locking tongues the clamping element is moved only when the webbing is moved in the locking tongue.

From the state of the art moreover locking tongues are known which include a clamping element which is movably arranged at an acute angle with respect to the webbing passage and, resp., with respect to the longitudinal direction of the locking tongue. Said locking tongues may be inserted in the webbing passage independently of the movement of the webbing, for instance by a tensile force of the webbing acting on the clamping element.

Both embodiments have the drawback, however, that the clamping element is drawn into the webbing passage by the tensile force acting on the webbing and gets jammed there. Hence the clamping element may get jammed in the webbing passage. It is frequently only possible to release the blocking by pulling the webbing into the opposite direction and thus moving the clamping element out of the blocking position back into the home position.

SUMMARY OF THE INVENTION

It is the object of the invention to provide a locking tongue for a seat belt that enables the clamping of the webbing to be quickly and reliably released upon completion of the restraining event. It is another object of the invention to provide a method of manufacturing such locking tongue.

For achieving the object a locking tongue for a seat belt is provided comprising an inserting portion adapted to be inserted into a belt buckle and a deflecting portion for webbing, with the deflecting portion including a webbing passage and a clamping element for the webbing. The clamping element is displaceable between a home position in which the webbing is freely movable and a blocking position in which the clamping element is displaced against the wall of the webbing passage so that the webbing is clamped between the damping element and the wall of the webbing passage. The clamping element includes a clamping surface which in the blocking position clamps the webbing against the wall of the webbing passage. In accordance with the invention, the clamping element is guided along a curved guide path extending in the area of the blocking position substantially perpendicularly to the wall so that in the blocking position the clamping element is guided substantially perpendicularly with the clamping surface against the wall. Advantageously, the effective height of the clamping surface, measured in the longitudinal direction of the webbing, is larger than the height of the guide path. In this way, on the one hand a large clamping surface can be ensured and on the other hand a reduced mass of the clamping element is enabled. For this purpose, the area of the clamping surface may be bent vis-à-vis the guide path or the clamping portion including the clamping surface may be thickened vis-à-vis the part of the clamping element located in the guide path.

According to the invention, the damping surface is moved against the wall of the webbing passage so that it is arranged in parallel to the wall and is in full-surface contact with the latter. This is resulting in a large effective surface by which the webbing is clamped in the webbing passage so that a higher clamping force may be provided. In addition, the clamping element which is moved substantially perpendicularly against the wall entails the advantage that the clamping element may be released again independently of tensile force acting on the webbing. The clamping element is not drawn into the webbing passage by the webbing and thus cannot get jammed in the webbing passage. Hence the webbing can be released more easily as soon as the tension on the webbing weakens. Especially, the clamping element may also be released when there is tensile force still acting on the webbing. A larger clamping surface acting on the full surface of the webbing moreover offers the advantage of a significantly lower wear of the webbing. Punctual or linear contacts can be avoided in this way. In particular, punctual or linear loads acting between two weft threads of the webbing with an excessive pressing force can be avoided. The clamping surface acting on the webbing may be further provided with a profiling and, resp., a surface structuring to enhance the clamping effect.

The clamping element is advantageously manufactured as a die casting made of aluminum or zinc alloy. In this way profiling and, resp., structures may be formed on the clamping surface in a simple manner.

The damping element for example takes a curved shape, especially a circular arc shape, in cross-section, wherein at a first end a deflecting surface for the webbing is provided and at an opposite end the damping surface is provided. Hence the webbing is adjacent to the end of the clamping element opposed to the clamping surface and is deflected there. As soon as tensile force acts on the webbing, the clamping element is drawn by the deflected webbing from the home position into the blocking position. In this way the webbing is quickly blocked, wherein no friction is required between the webbing and the clamping element, however, to move the clamping element into the blocking position.

The curved configuration of the clamping element having a bent clamping surface moreover offers the advantage that a very small construction height (normal to the inserting direction) of the locking tongue is possible. In this way the lever arm between the inserting plane into the belt buckle and the force transmission by the pelvis belt portion may be minimized.

Independently of the shape of the clamping element preferably a guideway is provided along which the clamping element may be moved. Said guideway ensures the clamping element to be moved substantially perpendicularly with the clamping surface against the wall. However, the clamping surface is not required to be arranged substantially in parallel to the wall and, resp., to be moved perpendicularly to the latter during the entire movement from the home position into the blocking position. Especially, the guide may take a curved shape so that the clamping element is also swiveled when it is displaced along the guideway.

The clamping element may be completely supported in the guideway. However, it is also possible to guide the clamping element in the guideway merely by means of projections. Thus the guideway may be designed to be narrower so that the construction height of the locking tongue will become smaller.

The clamping element may be fixed on the deflecting portion independently of the support in the home position. When defined force acting onto the webbing is exceeded, for example predetermined breaking points may be released so that the damping element is movable into the blocking position. When such predetermined breaking points are present, the webbing can be released or blocked only once, however. In order to obtain reversible blocking of the webbing the clamping element is preferably supported to be freely movable along the guide path and a spring element is provided for urging the clamping element into the home position. When defined tensile force acting on the webbing is exceeded, the clamping element is moved against the spring force from the home position to the blocking position. When the force acting on the webbing decreases upon completion of the case of restraints the spring element may force the clamping element back into the home position so that subsequently regular operation of the locking tongue is possible. The spring moreover helps to prevent the clamping element from rattling, as the latter is forced by the spring element against a stop at the deflecting portion and/or at an overmolding free from play.

The spring element may advantageously be a leaf spring enabling any arrangement of the spring element en the deflecting portion. The use of a leaf spring allows obtaining above all significantly higher spring forces as compared to coil or profile springs. Said higher forces for triggering especially offer the advantage that during normal operation, i.e. when the occupant is moving during normal driving operation, the clamping element is not triggered and hence a considerably improved comfort is obtained.

Irrespective of the previously mentioned embodiments, the deflecting portion may include an overmolding, especially made of plastic material, which encloses the deflecting portion at least in portions. The clamping element may be molded for example in the home condition into the overmolding so that it is completely fixed in the overmolding. When a trigger force, viz. defined tensile force acting on the webbing, is exceeded, the clamping element is released from the overmolding and may arrive at the blocking position.

Advantageously, the clamping element is wider than the webbing passage. This may be achieved by designing undercuts at the overmolding so that no gap is formed between the clamping land and the overmolding. In this way the webbing can be prevented from getting jammed between the clamping land and the overmolding.

Furthermore, for achieving the object a method of manufacturing a locking tongue according to the invention is provided comprising the following features of:

providing a deflecting portion, positioning the clamping element on the deflecting portion, and partially surrounding the deflecting portion and the clamping element by injection-molding, with the clamping element being fixed to the deflecting portion.

BRIEF DESCRIPTION OF THE DRAWINGS

Further advantages and features will be resulting from the following description in conjunction with the enclosed drawings, in which.

DESCRIPTION

Figure 1:
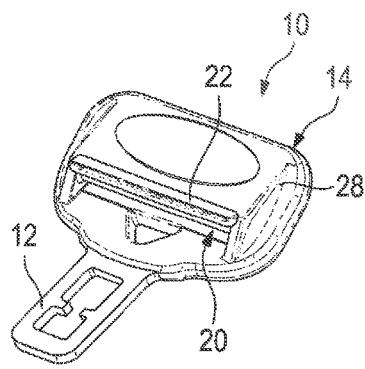
FIG. 1 shows a perspective view of a locking tongue according to the invention.

In FIGS. 1 to 4 a locking tongue 10 for a seat belt in a vehicle is illustrated. The locking tongue 10 includes an inserting portion 12 adapted to be inserted into a belt buckle and to be locked there as well as a deflecting portion 14 adapted to be threaded onto webbing 16 and to deflect said webbing 16 (cf. FIGS. 5a to 5d). The deflecting portion 14 includes an overmolding 18 made of plastic which completely encloses the deflecting portion 14.

As is especially evident from FIG. 2, a webbing passage 20 through which the webbing 16 is guided and a clamping element 22 whose function will be explained hereinafter are provided on the deflecting portion 14. The clamping element 22 takes a curved shape, in this embodiment a circular arc shape, in cross-section and includes a clamping surface 24 feeing the webbing passage 20 as well as a deflection surface 26 disposed at the opposite end. On the side of the clamping element 22 are arranged projections 28 by which the clamping element 22 is guided laterally in a guideway 30 provided at the deflecting portion 14. The guideway 30 may be formed by the overmolding 13 and/or by the deflecting portion 14.

The basic functioning of the clamping element 22 will be illustrated hereinafter by way of the FIGS. 5a to 5d.

Figure 5A:
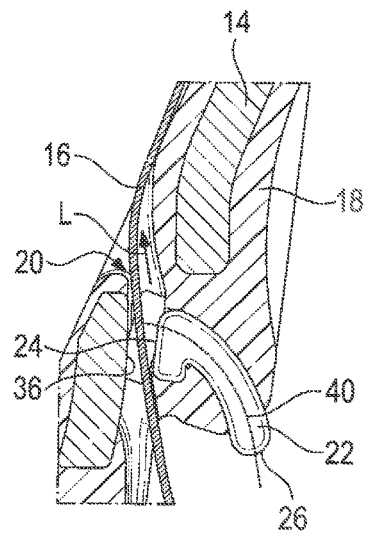
FIGS. 5a to 5d show a sectional view of the locking tongue from FIG. 1 in the area of the clamping element during the displacing operation from the home position to the blocking position.

In a home position shown in FIG. 5a the webbing 16 is guided through the webbing passage 20 and may be displaced in the longitudinal direction L through the webbing passage 20.

Figure 5B:
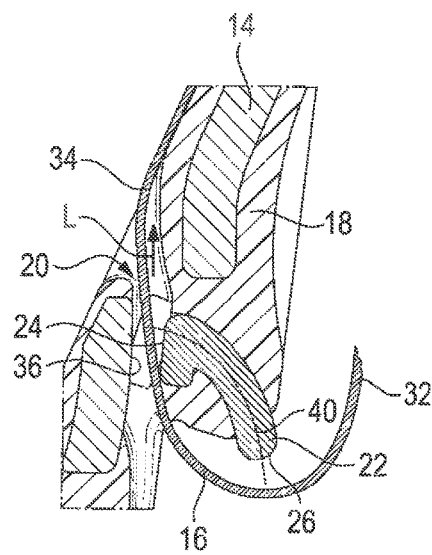
Figure 5C:
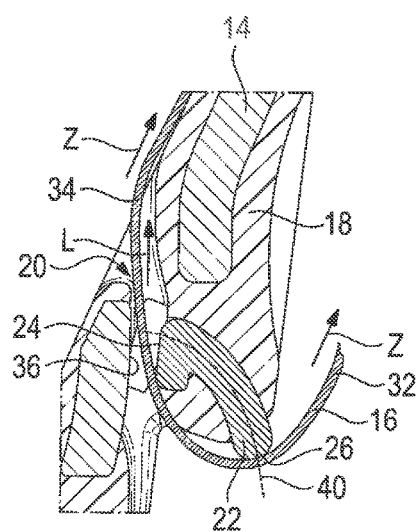

Upon buckling the webbing 16 then extends in U-shape through the deflecting portion 14, with the webbing 16 being divided into a first portion 32 and a second portion 34 (FIG. 5b). The first portion 32 is guided around the pelvis area of a vehicle occupant, for example, and the second portion 34 extends starting from the locking tongue 10 around the upper body of the vehicle occupant, In the buckled state shown in FIG. 5b the webbing 16 may be moved freely through the deflecting portion 14 so that an adaptation in length of the two portions 32, 34 is possible in connection with a belt retractor. The webbing 16 thus may be adjusted so that both portions 32. 34 are in contact with the vehicle occupant. This prevents the vehicle occupant reliably from moving forward when the seat belt blocks.

In a case of restraint the belt retractor is blocked. When the vehicle occupant then moves forward out of position, a tensile force Z acts on each of the two portions 32, 34 (cf. FIG. 5c). The webbing 16 is pulled close to the clamping element 22 by the tensile forces Z. Subsequently the clamping element 22 is displaced by the webbing 16 along the guideways 30 and is moved into the webbing passage 20.

The clamping element 22 is inserted into the webbing passage 20 until it abuts against an opposite well 36 and the webbing is clamped between the wall 36 and the clamping surface 24 of the clamping element 22.

Figure 5D:
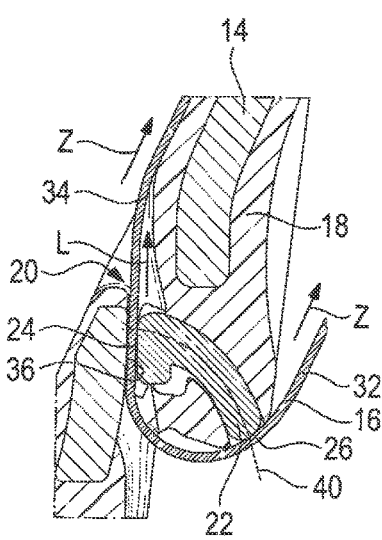

In this blocking position of the clamping element 22 the webbing 16 is fixed to the locking tongue 10 (FIG. 5d). Shortening of the first portion 32 and consequently constricting the first portion 32 laid around the pelvis by a forward movement of the upper body and the resulting lengthening of the second portion 34 is thus reliably excluded.

Since with an increasing tensile force Z acting on the webbing 16 also the force by which the clamping element 22 is pressed against the wall 36 increases, reliable fixation of the webbing 16 is ensured even with high tensile forces Z acting on the webbing 16.

Figure 2:
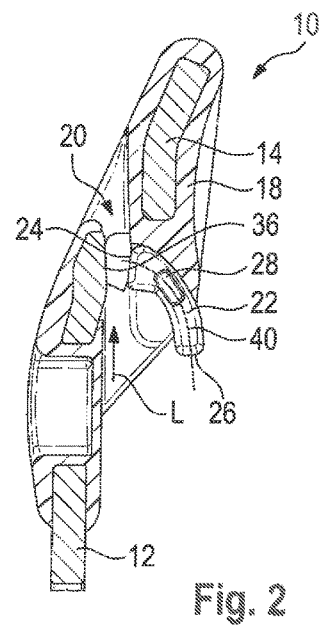
FIG. 2 shows a sectional view across the locking tongue from FIG. 1.
Figure 3:
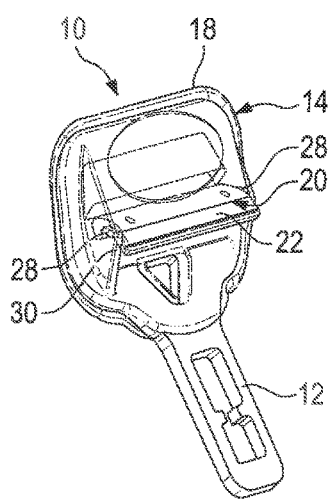
FIG. 3 shows a perspective partial sectional view across the locking tongue from FIG. 1.
Figure 4:
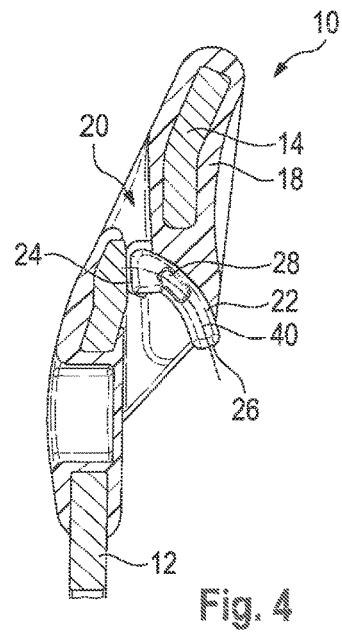
FIG. 4 shows the locking tongue from FIG. 2 with the clamping element being in a blocking position.

As is evident from the FIGS. 2 and 4, the clamping element 22 is movably guided on a curved guide path 40. The clamping surface 24 is arranged so that it is moved in the blocking position shown in FIG. 4 substantially perpendicularly against the wall 36 of the webbing passage 20 and in the blocking position is adjacent to the wall 36 substantially in parallel thereto.

In this way the contact area between the webbing 16 and the clamping surface 24 is increased so that a higher retaining force can be provided for the webbing 16.

The curved shape of the clamping element 22 causes the tensile force Z substantially acting in the direction of the webbing 16 to be deflected so that the clamping element is forced substantially perpendicularly against the wall 36.

Since the clamping element 22 is guided substantially perpendicularly against the wall 36 by the clamping surface 24, the clamping element 22 is not pressed into the webbing passage 20. Moreover, the clamping element 22 cannot be drawn into the webbing passage 20 by the webbing 16, either. Hence the clamping element 22 cannot get jammed or wedged within the webbing passage 20.

Upon completion of the case of restraint and weakening of the tensile force Z acting on the webbing 16 and the deflecting surface 26 of the clamping element 22, the clamping element 22 may be easily returned from the blocking position to the borne position. For this purpose, the webbing need not be moved in the webbing passage 20.

In particular, it is also possible to return the clamping element 22 to the home position, when tensile force Z continues acting on the second portion 34, as the damping element 22 is not retained in the blocking position by the webbing 16. It is merely necessary that there is no force acting on the deflecting surface 26.

It is thus possible to return the clamping element from the blocking position to the home position independently of the tensile force Z acting in the case of restraint in a simple manner and by the same force. In particular no jammed or wedged clamping element 22 has to be released.

In the embodiment illustrated in FIGS. 1 to 4 the clamping element 22 is molded into the overmolding 18 of the deflecting portion 14 and in this way is retained in the home position. When a defined tensile force Z is exceeded, said fixation is released and the clamping element 22 may be displaced into the blocking position (FIG. 4).

Figure 6A:
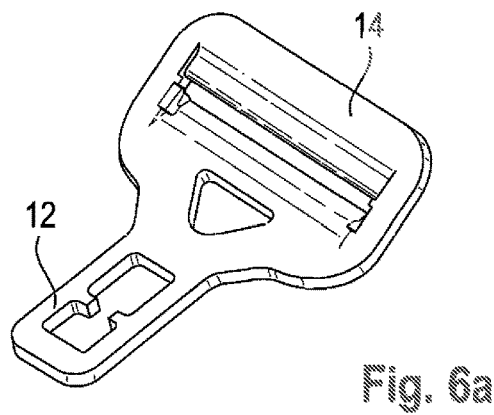
FIGS. 6a to 6c show different method steps for manufacturing the locking tongue from FIGS. 1 to 4.
Figure 6B:
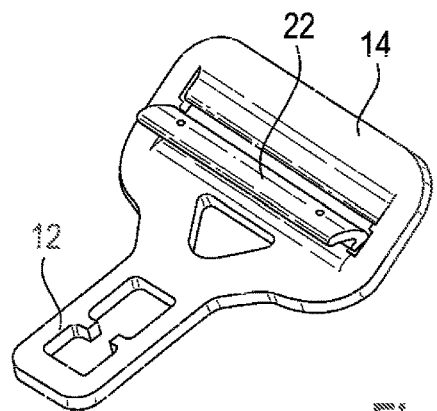
Figure 6C:
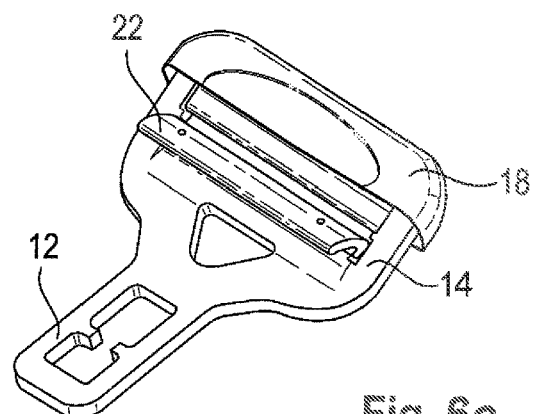
Figure 7:
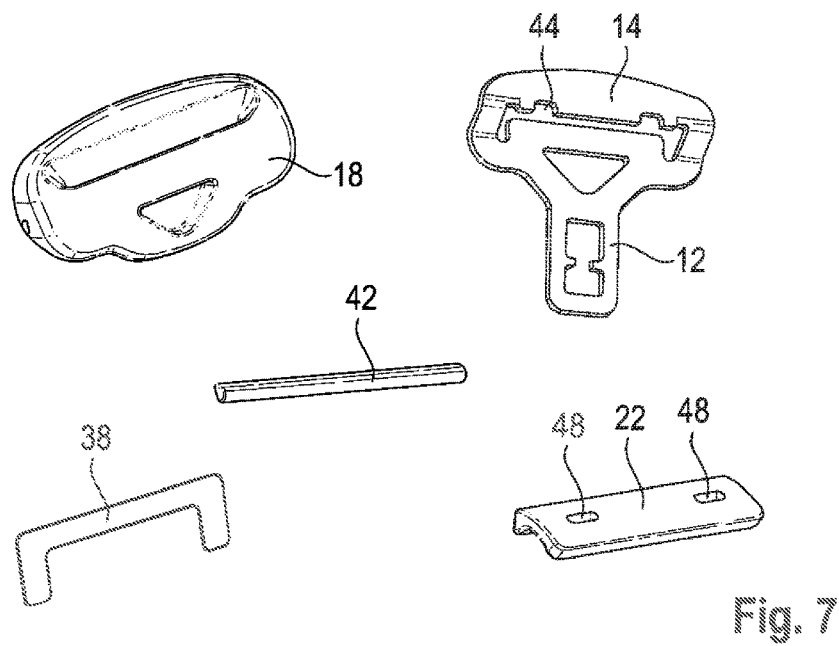
FIG. 7 illustrates an exploded view of a second embodiment of a locking tongue according to the invention.
Figure 8:
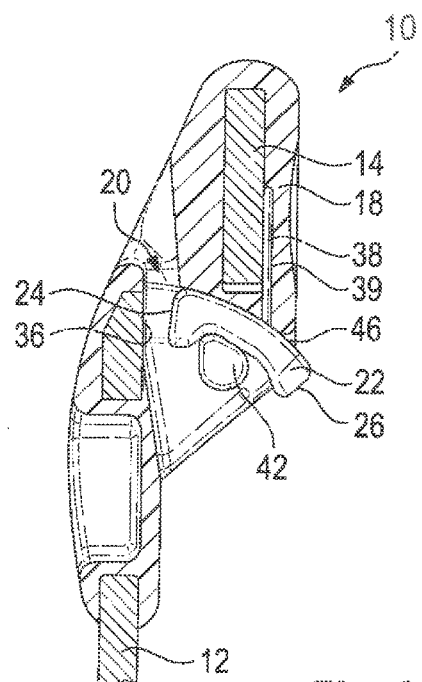
FIG. 8 shows a sectional view of the locking tongue from FIG. 7 with the damping element being in the home position.
Figure 9:
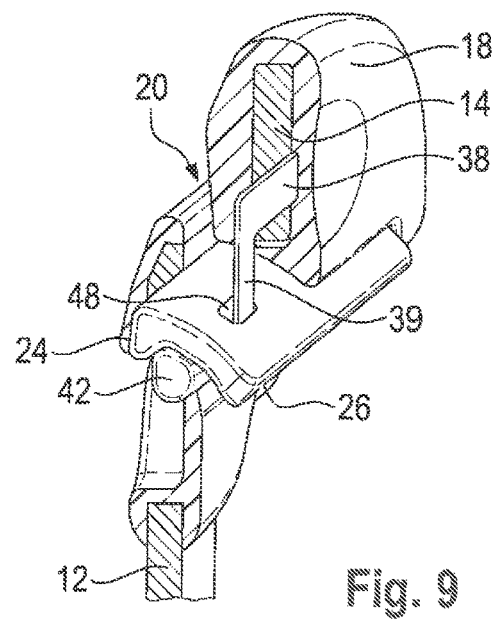
FIG. 9 shows a partial sectional view of the locking tongue from FIG. 8.
Figure 10:
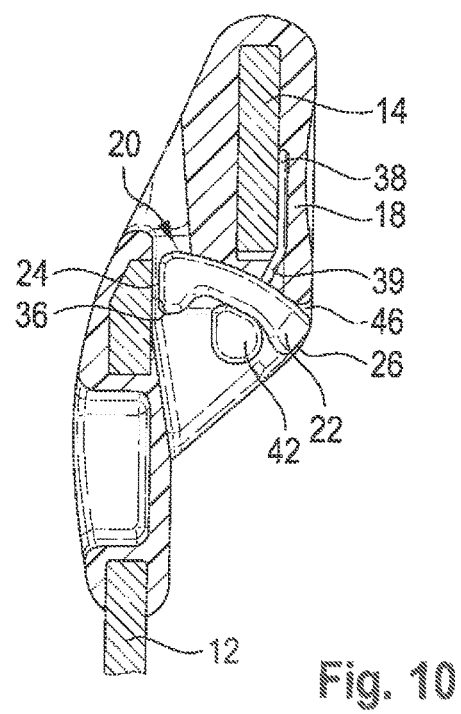
FIG. 10 shows a sectional view of the locking tongue from FIG. 8 with the clamping element being in the blocking position.
Figure 11A:
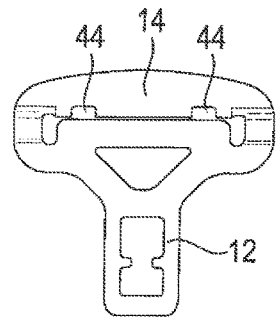
FIGS. 11a to 11e illustrate different method steps for manufacturing the locking tongue from FIGS. 7 to 10.
Figure 11B:
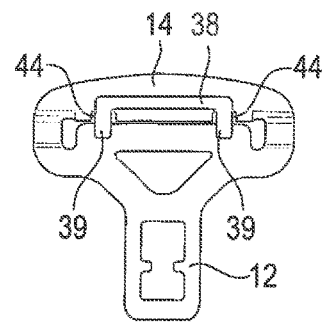
Figure 11C:
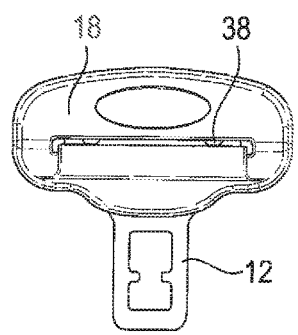
Figure 11D:
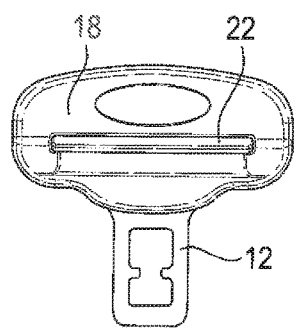
Figure 11E:
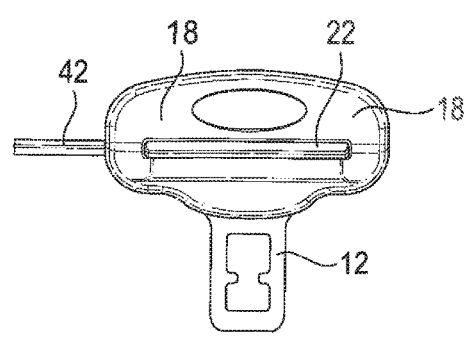

A method of manufacturing said locking tongue 10 is illustrated in FIGS. 6a to 6c. After providing the base body of the inserting portion 12 and the deflecting portion 14 (FIG. 6a), the clamping element 22 is positioned at the deflecting portion 14 in the home position (FIG. 6b). Subsequently the deflecting portion 14 is surrounded by injection-molding with the webbing passage 20 being kept free (FIG. 6c). In the home position the clamping surface 24 of the clamping element preferably is part of the webbing passage 20.

A second embodiment of a locking tongue according to the invention is shown in FIGS. 7 to 10.

The structure of said looking tongue 10 substantially corresponds to the locking tongue 10 illustrated in FIGS. 1 to 4. Other than in that embodiment, the clamping element 22 is freely movable in the guideway 30 and is not molded in the overmolding, however. In addition, a spring element 38 is provided which in this case is constituted by a leaf spring and Includes two resilient lands 39. Said spring element 38 is partly molded in the overmolding 18 and is supported by the deflecting portion 14. The spring element 38 engages in two openings 48 on the clamping element 22 and acts upon the latter in the home position (cf. FIGS. 8 and 9). Moreover, a retaining land 42 is arranged to fix the clamping element 22 to the deflecting portion 14.

When tensile force Z acts on the webbing 16, the clamping element 22 is moved against the spring force of the spring element 38 into the blocking position. As soon as the tensile force Z acting on the webbing 16 weakens, the spring element 38 withdraws the clamping element 22 into the home position. Thus a reversible use of the looking tongue 10 is possible.

A method of manufacturing said locking tongue 10 is illustrated in FIGS. 11a to 11e.

After providing the base body (FIG. 11a) the spring element 38 is Inserted Into a seat 44 (FIG. 11b) and the deflecting portion is subsequently surrounded by injection-molding (FIG. 11c), with the webbing passage 20 and a guide passage 46 for the clamping element 22 being kept free. In addition, a passage for the retaining land 42 is kept free.

Subsequently the clamping element 22 is inserted into the guide passage 46. The guide passage 46 is configured so that the clamping element 22 can also be inserted with a wide damping surface 24 and thus has play in the guide passage 46 in this condition. Said play is required for inserting the clamping element 22 past the spring element 38 into the guide passage 46. Finally the retaining land 42 is laterally inserted, thus causing the clamping element 22 to be pushed with the openings 48 onto the lands 39 of the spring element 38 and the guide passage 46 to be narrowed so that the clamping element 22 is guided free from play.

Figure 12:
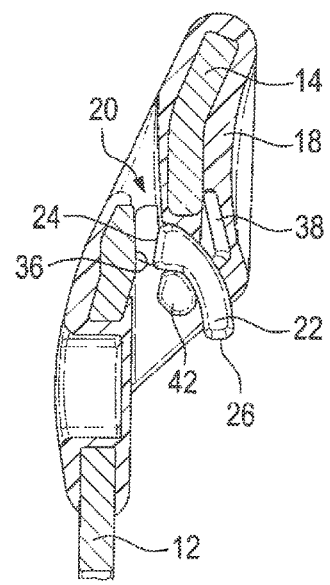
FIG. 12 illustrates a third embodiment of a locking tongue according to the invention.

The embodiment shown in FIG. 12 differs from the embodiment shown in FIGS. 7 to 10 merely by the spring element 38 being a torsion spring or a yoke spring, respectively.

Figure 13:
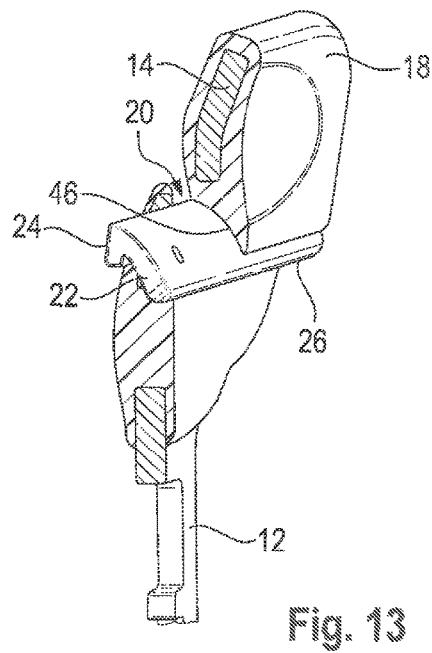
FIG. 13 illustrates a fourth embodiment of a locking tongue according to the invention.
Figure 14:
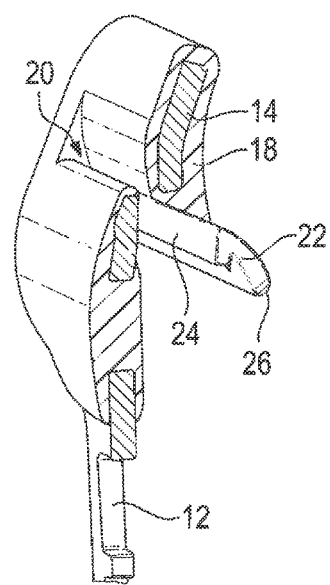
FIG. 14 shows a partial sectional view of the locking tongue from FIG. 13.
Figure 15:
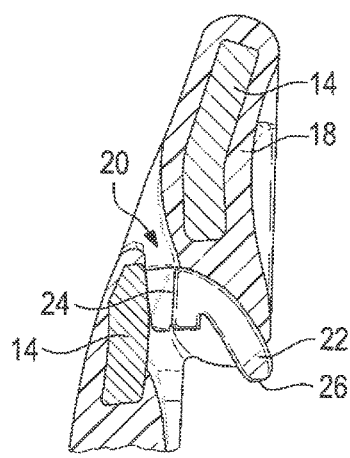
FIG. 15 shows another partial sectional view of the locking tongue from FIG. 13.

FIGS. 13 to 15 illustrate a third embodiment of a locking tongue 10 according to the invention. The latter substantially corresponds to the locking tongue 10 shown in FIGS. 1 to 4. The end of the clamping element 22 on the side of the clamping surface is hook-shaped in cross-section (cf. FIG. 13), however, so that a wider clamping surface 24 is formed.

Irrespective of this embodiment, the clamping element 22 may also be fixed in the home position or forced into the home position, resp., in a different way. For example, it is possible to provide bolts or other elements having a predetermined breaking point. Instead of the spring elements 38, for example, also rubber elements or other resilient elements may be used which act on the clamping element 22 in the home position and, respectively, return the latter to the home position upon completion of the event of restraint.

The invention claimed is:

1. A locking tongue (10) for a seat belt comprising an inserting portion (12) adapted to be inserted into a belt buckle and a deflecting portion (14) for a webbing (16), wherein the deflecting portion (14) includes a webbing passage (20) through which the webbing (16) is guided and a clamping element (22) for the webbing (16), the clamping element (22) being displaceable between a home position in which the webbing (16) is freely movable and a blocking position in which the clamping element (22) is displaced against a wall (36) of the webbing passage (20) so that the webbing (16) is clamped between the clamping element (22) and the wall (36) of the webbing passage (20), the clamping element (22) including a clamping surface (24) which in the blocking position clamps the webbing (16) against the wall (36) of the webbing passage (20),
wherein the clamping element (22) is guided along a curved guide path (40) extending in an area of the blocking position substantially perpendicularly to the wall (36) so that in the blocking position the clamping element (22) is moved against the wall (36) substantially perpendicularly with the clamping surface (24),
wherein an effective height of the clamping surface (24), measured in a longitudinal direction of the webbing (16), is larger than a height of the guide path,
and wherein the clamping surface (24) in the blocking position is arranged in parallel to the wall (36) and is in full-surface contact with the latter.

2. The locking tongue according to claim 1, wherein the clamping element (22) takes a circular arc shape, in cross-section, the clamping element (22) having a first end in which a deflecting surface (26) for the webbing (16) is provided and a second, opposite end in which the clamping surface (24) is provided.

3. A method of manufacturing a locking tongue (10) according to claim 1, comprising the following features of:
providing the deflecting portion (14),
positioning the clamping element (22) on the deflecting portion (4), and
partly surrounding the deflecting portion (14) and the clamping element (22) by injection-molding so that the clamping element (22) is fixed to the deflecting portion (14).

4. The locking tongue according to claim 1, wherein at least one guideway (30) is provided along which the clamping element (22) is moved.

5. The locking tongue according to claim 4, wherein projections (28) guided in the guideway (30) are arranged on the clamping element (22).

6. The locking tongue according to claim 1, wherein a spring element (38) is provided for forcing the clamping element (22) into the home position.

7. The locking tongue according to claim 6, wherein the spring element (38) is a leaf spring.

8. The locking tongue according to claim 6, wherein the spring element (38) engages at least one opening (48) on the clamping element (22) to force the clamping element (22) into the home position.

9. The locking tongue according to claim 1, wherein the deflecting portion (14) includes an overmolding (18) which encloses the deflecting portion (14) at least in portions, and in that the clamping element (22) is molded into the overmolding (18) in the home position.

10. The locking tongue according to claim 1, wherein the guide path has a first end that faces toward and is parallel to the wall (36), a height of the first end, measured in the longitudinal direction of the webbing (16), being smaller than the effective height of the clamping surface (24), measured in the longitudinal direction of the webbing (16), a portion of the clamping element (22) being surrounded by the first end.

11. The locking tongue according to claim 1, wherein
the deflecting portion (14) includes an overmolding (18) which encloses the deflecting portion (14) at least in portions, and
the guide path has a first end that faces toward and is parallel to the wall (36), the first end extending in the longitudinal direction of the webbing (16) from a first side that is bounded by the overmolding (18) to a second side that faces oppositely to the first side, a portion of the clamping element (22) being positioned between the first and second sides of the first end, a height between the first and second sides of the first end, measured in the longitudinal direction of the webbing (16), being smaller than the effective height of the clamping surface (24), measured in the longitudinal direction of the webbing (16).

12. The locking tongue according to claim 1, wherein
the deflecting portion (14) includes an overmolding (18) which encloses the deflecting portion (14) at least in portions,
the clamping element (22) has a first end in which a deflecting surface (26) for the webbing (16) is provided and a second, opposite end in which the clamping surface (24) is provided, the clamping element (22) having oppositely facing first and second surfaces that extend between the deflecting surface (26) and the clamping surface (24), and
the first surface of the clamping element (22) directly contacts at least a portion of the overmolding (18) as the clamping element (22) is displaced between the home and blocking positions.

13. The locking tongue according to claim 1, wherein the clamping element (22) has the clamping surface (24) at a first end, a deflecting surface portion (26) at a second, opposite end, a body that extends between the clamping surface (24) and the deflecting surface portion (26), and oppositely facing first and second surfaces that extend from the clamping surface (24), over the body and to the deflecting surface portion (26), a distance between the first and second surfaces at the clamping surface (24) being larger than a distance between the first and second surfaces at the body and larger than a distance between the first and second surfaces at the deflecting surface portion (26).

14. The locking tongue according to claim 13, wherein the height of the guide path is larger than or equal to the distance between the first and second surfaces at the body and larger than or equal to the distance between the first and second surfaces at the deflecting surface portion (26), the height of the guide path being smaller than the distance between the first and second surfaces at the clamping surface (24).

15. The locking tongue according to claim 13, wherein at least one of the body and the deflecting surface portion (26) of the clamping element (22) are positioned within the guide path while the clamping surface (24) of the clamping element (22) protrudes from the guide path.

16. The locking tongue according to claim 1, wherein
the deflecting portion (14) includes an overmolding (18) which encloses the deflecting portion (14) at least in portions,
the guide path extends between a first surface of the overmolding (18) and a second surface of the overmolding (18), the second surface of the overmolding (18) facing toward the first surface of the overmolding (18), and
a distance between the first and second surfaces of the overmolding (18) is smaller than the effective height of the clamping surface (24).

17. The locking tongue according to claim 1, wherein
the deflecting portion (14) includes an overmolding (18) which encloses the deflecting portion (14) at least in portions,
the guide path extends between a first surface of the overmolding (18) and a first surface of a retaining land (42) that fixes the clamping element (22) to the deflecting portion (14), the first surface of the retaining land (42) facing toward the first surface of the overmolding (18), and
a distance between the first surface of the overmolding (18) and the first surface of the retaining land (42) is smaller than the effective height of the clamping surface (24).

18. The locking tongue according to claim 1, wherein the clamping element (22) has a first end in which a deflecting surface (26) for the webbing (16) is provided and a second, opposite end in which the clamping surface (24) is provided, and a portion of the clamping surface (24) that contacts the webbing (16) in the blocking position is larger than a portion of the deflecting surface (26) that contacts the webbing (16) in at least one of the blocking and home positions.

* * * * *